Figure 1:
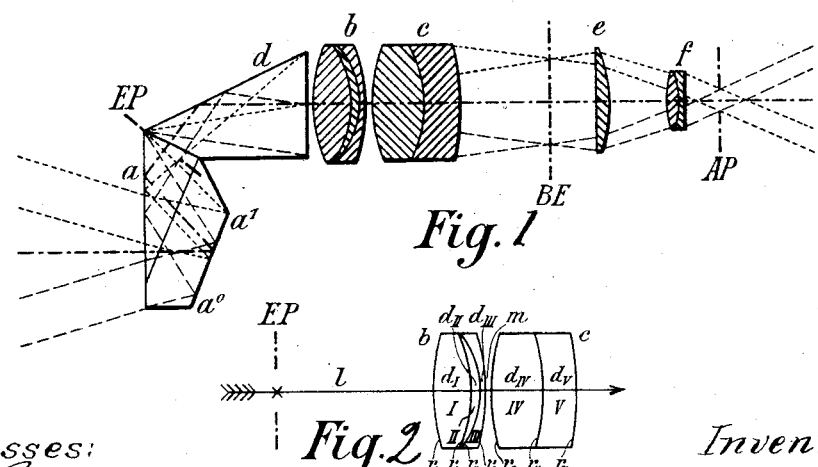

No. 754,076. PATENTED MAR. 8, 1904.
A. KÖNIG.
LOW POWER TELESCOPE.
APPLICATION FILED FEB. 6, 1903.

NO MODEL.

Witnesses:
Paul Krüger
Fritz Sander

Inventor
Albert König

No. 754,076. Patented March 8, 1904.

UNITED STATES PATENT OFFICE.

ALBERT KÖNIG, OF JENA, GERMANY, ASSIGNOR TO THE FIRM OF CARL ZEISS, OF JENA, GERMANY.

LOW-POWER TELESCOPE.

SPECIFICATION forming part of Letters Patent No. 754,076, dated March 8, 1904.

Application filed February 6, 1903. Serial No. 142,234. (No model.)

*To all whom it may concern:*

Be it known that I, ALBERT KÖNIG, doctor of philosophy, a subject of the King of Prussia, German Emperor, residing at Carl Zeissstrasse, Jena, in the Grand Duchy of Saxe-Weimar, German Empire, have invented a new and useful Low - Power Telescope, of which the following is a specification.

The invention relates to low - power telescopes—say of a linear magnification between one-half and two—having a large field of view—say twenty to forty degrees. If telescopes of this description were constructed with ordinary eyepieces, they would have their exit-pupil not as near to the hindermost lens-surface of the eyepiece as to enable the observer to overlook the large field of view, and if they were constructed with extraordinary eyepieces, including an additional collecting-lens in proximity of the image plane, (for the purpose of inducing a suitable position of the exit-pupil,) the marginal parts of the image would not be distinctly visible. According to the invention these difficulties are removed by employing an eyepiece of an ordinary type and of ordinary dimensions, but displacing the entrance-pupil, hitherto realized by the mounting of the objective-lens far before the objective, whereby the exit-pupil is approached to the eye-lens. The entrance-pupil needs not be represented by a diaphragm; but its place may be determined by a real exit-pupil, each of these two pupils being, as is well known, the optical image of the other as produced by the instrument. Thus a diaphragm behind the eyepiece or the pupil of the observer's eye—the position of which latter may be fixed by a proper height of the eyepiece-cup—would represent the exit-pupil and at the same time locate and define the entrance-pupil of the telescope. The unusual position of the entrance-pupil, together with a large field of view, requires the objective to be constructed with a large relative aperture (up to 1:1.5) and to be corrected not only spherically and chromatically, but also astigmatically. Instead of nullifying astigmatism the image-field may be anastigmatically flattened in such a way that the image - surface formed by meridional or primary pencils and that formed by the secondary pencils are nearly symmetrical to the ideal plane of image determined by the axial focal point. A telescope-objective having these qualities consists of two separate collective lens systems, one of which may likewise comprise two separate members—for instance, a dispersive lens and a collective lens. If a telescope of this description is to be fitted with a prism system for reërecting the image, this system should be located in front of the objective, preferably before and behind the entrance-pupil. To arrange the prism system between the objective and the eyepiece, as in ordinary prism-telescopes, would require a comparatively large size of this system, as in the type of telescope created by the present invention the diameter of the image widely surpasses that of the objective. The space occupied by the totality of pencils of rays from the points of the object to the field-lens of the eyepiece has its smallest diameter in the entrance-pupil, so that the prism system closely compressed in proximity of this pupil takes up as small a volume as possible.

Figure 2:
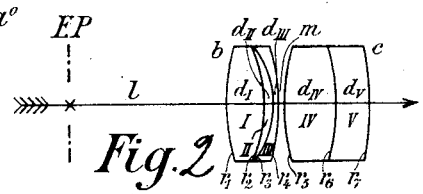

In the accompanying drawings, Figure 1 represents a telescope constructed according to the invention. Fig. 2 is a separate representation of the objective of the telescope.

In the telescope shown in Fig. 1 the image is reërected by means of a prism system, the two prisms of which are cemented together in proximity of the entrance-pupil E P. The front prism $a$ substantially precedes the entrance-pupil, whereas between this pupil and the bipartite objective $b\ c$ the back prism $d$ is inclosed. The eyepiece is an ordinary one, as it consists of a field-lens $e$ and an eye-lens $f$. It is of the Ramsden type, for it is entirely situated behind the image plane B E. The magnifying power has been supposed to be only little higher than one, so that the extreme left and right pencils cross each other in the exit-pupil A P at a hardly wider angle than in the entrance-pupil E P. The rays entering the front prism $a$ are twice totally reflected at a so-called "roof" having the ridge-line $a^0 a'$. The well-known effect of this double reflection is a deflection of the optical axis accompanied by an inversion of the image. Before emerging from the front prism the rays impinge on a third totally-reflecting surface, (in the same plane as the surface of entrance,) while the fourth surface of this kind is opposed to the rays by the back prism $b$. The effect of the third reflection as to the position of the image is undone by the fourth reflection, and the effect of both reflections as to the deflection of the axis consists in making this axis parallel to its original direction.

The objective separately represented in Fig. 2 consists of two members $b$ and $c$. It is spherically corrected for a relative aperture 1:2.5, and its image-field is anastigmatically flattened in the sense explained above. The front member $b$ consists of three lenses cemented together—a biconvex lens I, a concavoconvex lens II, and a convexo-concave lens III. The back member $c$ comprises two cemented lenses—a biconvex lens IV and a convexo-concave lens V. In the following table the radii, thicknesses, and distances of these lenses are enumerated as reduced to a focal distance 1. Moreover, for characterizing the kinds of glass of which the lenses are made the refractive indices $n_C$ and $n_F$ for the lines C and F, respectively, of the solar spectrum are added.

*Radii, Thicknesses, and Distances.*

$r_1 = +1.1150$  $l = 0.8992$
$r_2 = -0.6906$  $d_I = 0.1951$
$r_3 = -0.4504$  $d_{II} = 0.0502$
$r_4 = -1.9656$  $d_{III} = 0.0139$
$r_5 = +0.9757$  $m = 0.0279$
$r_6 = -0.7001$  $d_{IV} = 0.2926$
$r_7 = -7.9508$  $d_V = 0.1951$

*Kinds of Glass.*

|  | I | II | III | IV | V |
|---|---|---|---|---|---|
| $n_C =$ | 1.51260 | 1.60473 | 1.60474 | 1.50903 | 1.65186 |
| $n_F =$ | 1.52139 | 1.61546 | 1.62097 | 1.51706 | 1.66995 |

What I claim as my invention, and desire to secure by Letters Patent, is—

1. In a low-power telescope having a large field of view the combination with an ordinary eyepiece and an erecting system of a spherically, chromatically and astigmatically corrected objective which is located at some distance behind the entrance-pupil.

2. In a low-power telescope having a large field of view the combination with an ordinary eyepiece of a spherically, chromatically and astigmatically corrected objective which is located at some distance behind the entrance-pupil and an inverting prism system arranged entirely before the objective and including the entrance-pupil.

3. In a low-power telescope having a large field of view the combination with an ordinary eyepiece of a spherically, chromatically and astigmatically corrected objective which has a large relative aperture, consists of two separate collective lens systems and is located at some distance behind the entrance-pupil.

In testimony whereof I have signed my name to this specification in the presence of two subscribing witnesses.

ALBERT KÖNIG.

Witnesses:
PAUL KRÜGER,
FRITZ SANDER.